(12) United States Patent
Fan

(10) Patent No.: US 8,210,553 B2
(45) Date of Patent: Jul. 3, 2012

(54) PEDAL DRIVING DEVICE OF STANDING TYPE BICYCLE

(75) Inventor: Jeeng-Neng Fan, Taoyuan (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 0 days.

(21) Appl. No.: 13/156,380

(22) Filed: Jun. 9, 2011

(65) Prior Publication Data

US 2012/0013097 A1    Jan. 19, 2012

(30) Foreign Application Priority Data

Jul. 19, 2010 (TW) .............................. 99213720 U

(51) Int. Cl.
B62M 1/00 (2010.01)
(52) U.S. Cl. ........................................ 280/221; 280/252
(58) Field of Classification Search ............... 280/221, 280/253, 256, 257, 260, 261, 252
See application file for complete search history.

(56) References Cited

U.S. PATENT DOCUMENTS

| 2,466,105 | A | * | 4/1949 | Hoffman | 280/221 |
| 4,846,488 | A | * | 7/1989 | Szadkowski | 280/221 |
| 6,588,784 | B1 | * | 7/2003 | Chen | 280/221 |
| 6,659,486 | B2 | * | 12/2003 | Eschenbach | 280/221 |
| 7,686,317 | B2 | * | 3/2010 | Hartmann | 280/256 |
| 7,784,808 | B2 | * | 8/2010 | Fan | 280/221 |
| D638,500 | S | * | 5/2011 | Scolari et al. | D21/423 |
| 2003/0025293 | A1 | * | 2/2003 | Drew | 280/253 |
| 2007/0024019 | A1 | * | 2/2007 | Tarlow et al. | 280/221 |
| 2010/0225087 | A1 | * | 9/2010 | Brusca | 280/260 |

* cited by examiner

Primary Examiner — Tashiana Adams
(74) Attorney, Agent, or Firm — Rosenberg, Klein & Lee

(57) ABSTRACT

An improved pedal driving device of a standing type bicycle includes driving sprockets installed at positions of first and second rotating shafts of first and second cranks respectively, and a chain installed between the two driving sprockets for rotating the two driving sprockets synchronously, such that left and right pedals pivotally and respectively installed between other ends of the first and second cranks and provided for pedaling by a user's legs, and when the first and second cranks drive the first and second rotating shafts to rotate, the two driving sprockets and the chain are operated together to rotate the first and second rotating shafts and the first and second cranks synchronously and drive the left and right pedals to revolve along an elliptical track with a clash-free and smooth movement, so as to achieve a smooth, comfortable and safe operation of the bicycle.

3 Claims, 6 Drawing Sheets

PEDAL DRIVING DEVICE OF STANDING TYPE BICYCLE

BACKGROUND OF THE INVENTION

1. Field of the Invention

The present invention relates to a pedal driving device of a standing type bicycle, and more particularly to an improved pedal driving device with simple, economic, user-friendly and convenient features and capable of providing a clash-free, smooth, comfortable and safe pedaling operation of a standing type bicycle and satisfying the actual applicability and design requirements.

2. Description of the Prior Art

With reference to FIG. 1 for a conventional standing type bicycle, the standing type bicycle comprises: a frame 10 having a front fork 102 installed to a front tube 101 at the front of the frame, a front wheel 11 installed at the bottom of the front fork 102, and a control rod 12 with a handle 121 installed at the top of the front fork 102 for controlling the traveling direction of the front wheel 11; a rear wheel 13 pivotally installed at the rear of the frame 10; a first rotating shaft 14 and a second rotating shaft 15, respectively and pivotally installed to the frame 10 and between the front and rear wheels 11, 13 with an appropriate distance apart from one another, and a first crank 16 and a second crank 17 being installed in opposite directions to each other and at both ends of the first and second rotating shafts 14, 15 respectively, and other ends of the first and second cranks 16, 17 being respectively and pivotally coupled the front and rear ends of pedal 18 by pivots 161, 171, such that when forces are applied to the pedals 18, the first and second cranks 16, 17 are operated synchronously; a transmission sprocket 19, 20, installed separately at the second rotating shaft 15 and the rear wheel rotating shaft 131; and a transmission chain 21 installed between the two transmission sprockets 19, 20, such that when a user steps on pedals 18 by both legs to rotate the first and second cranks 16, 17 by the first and second rotating shafts 14, 15 respectively, the rotating second rotating shaft 15 together with the coaxial transmission sprocket 19 will drive the transmission sprocket 20 of the rear wheel rotating shaft 131 to rotate through the transmission chain 21, so as to rotate the rear wheel 13 together and drive the front wheel 11 to drive the bicycle to move forward. When use, a rider stands on the left and right pedals 18 and steps on the left and right pedals alternately by both legs. Since an end of the first or second crank 16, 17 is installed to the first or second rotating shaft 14, 15, and another end of the first or second crank 16, 17 is pivotally coupled to the front or rear end of the pedal 18 by a pivot 161, 171, therefore when forces are applied to the pedals 18, the first and second rotating shafts 14, 15 are used as rotation points to loop in an elliptical track by using the first and second cranks 16 respectively as a radius. In the meantime, the rotating second rotating shaft 15 can drive the rear wheel 13 to rotate and drive the bicycle through the transmission sprockets 19, 20 and the transmission chain 21, so as to achieve the effect of riding a standing type bicycle.

Undeniably, the aforementioned method can achieve the effect of riding and driving a standing type bicycle, but its practical application still has the following drawbacks. Since the first and second cranks 16, 17 use the first and second rotating shafts 14, 15 as rotation points to loop in an elliptical track, the stepping forces applied onto the pedals 18 are exerted onto the pivots 161, 171 at both front and rear ends respectively. However, when the rider stands on the bicycle and steps on the pedals 18 alternately by both legs, the forces cannot be exerted onto the two pivots 161, 171 at the front and rear ends uniformly, but the forces will be applied at corresponding positions of the pedals 18 in different angles while the pedals 18 are rotating in an elliptical track. As a result, when the pedals 18 and the first and second cranks 16, 17 are rotated to a horizontal position and aligned linearly with each other, the non-uniform stepping forces applied to the front and rear pivots 161, 171 will cause the first and second cranks 16, 17 to produce clashes and unsmooth rotations. Particularly, when the left and right pedals 18 are idle and aligned horizontally and linearly, any further applying force will cause clashes or even jams of the first and second cranks 16, 17. Obviously, such unsmooth, uncomfortable and unsafe ride requires improvements.

In view of the aforementioned shortcomings of the prior art, the inventor of the present invention based on years of experience in the bicycle industry to conduct extensive researches and experiments, and finally developed the improved pedal driving device of a standing type bicycle to overcome the shortcomings of the prior art.

SUMMARY OF THE INVENTION

Therefore, it is a primary objective of the present invention to provide an improved pedal driving device of a standing type bicycle to overcome the aforementioned shortcomings and provide a smooth, comfortable and safe pedaling operation of the standing type bicycle.

To achieve the foregoing objective, the present invention provides an improved pedal driving device of a standing type bicycle comprising driving sprockets installed at positions of first and second rotating shafts of first and second cranks respectively, and a chain installed between the two driving sprockets for rotating the two driving sprockets synchronously, such that left and right pedals pivotally and respectively installed between other ends of the first and second cranks and provided for pedaling by a user's legs. When the first and second cranks drive the first and second rotating shafts to rotate, the two driving sprockets and the chain are operated together to rotate the first and second rotating shafts and the first and second cranks synchronously and drive the left and right pedals to revolve along an elliptical track with a clash-free and smooth movement, so as to achieve a smooth, comfortable and safe operation.

The objectives, technical characteristics and effects of the present invention will become apparent from the detailed description taken with the accompanying drawings as follows.

DETAILED DESCRIPTION OF THE PREFERRED EMBODIMENTS

Figure 1:
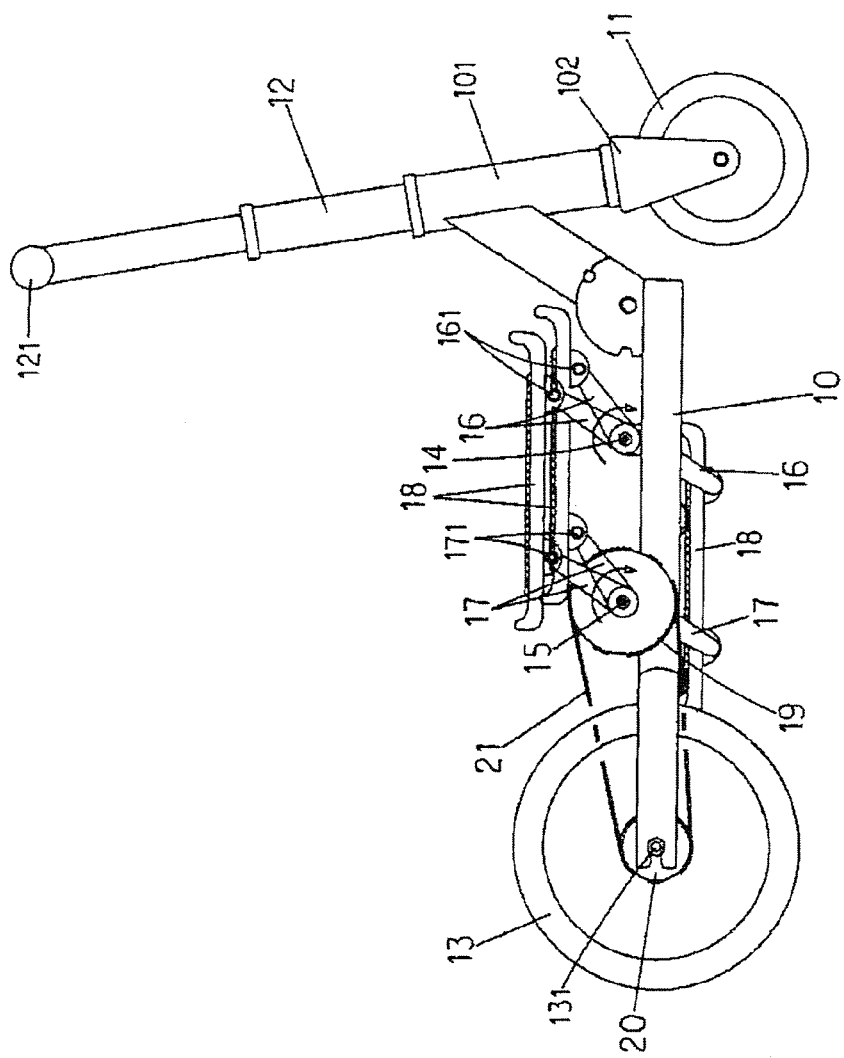
FIG. 1 is a schematic view of a conventional standing type bicycle.
Figure 2:
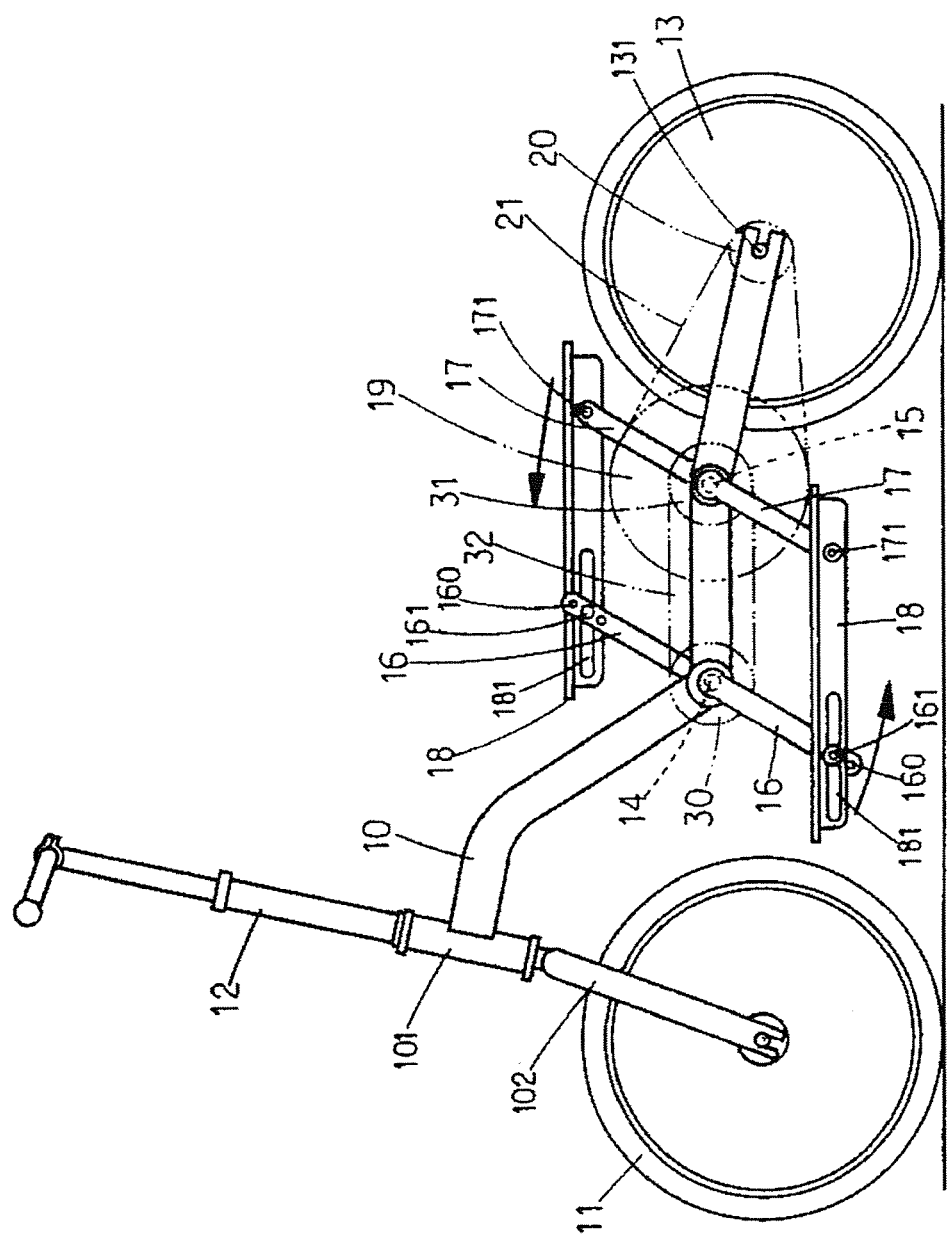
FIG. 2 is a schematic view of the first preferred embodiment of the present invention.
Figure 3:
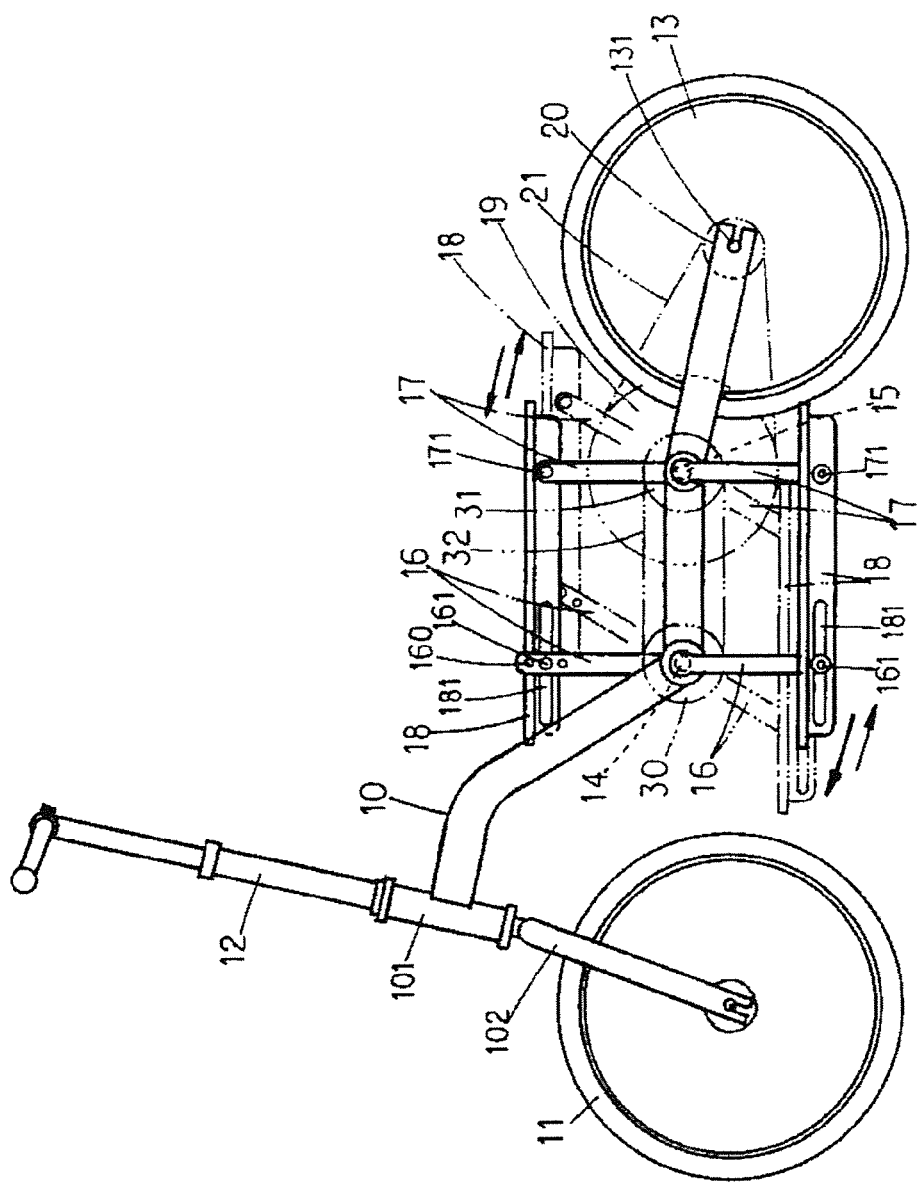
FIG. 3 is a schematic view of an operation of the first preferred embodiment as depicted in FIG. 2.

With reference to FIGS. 2 and 3 for an improved pedal driving device of a standing type bicycle of the present invention, the invention comprises: a frame 10, a front wheel 11, a control rod 12, a rear wheel 13, a first rotating shaft 14, a second rotating shaft 15, a first crank 16, a second crank 17, a pedal 18, a transmission sprocket 19, 20 and a chain 21, and the installation and coupling relations of these components are prior art, and thus will not be described here. The main improvement made by the present invention is to install driving sprockets 30, 31 at the first rotating shaft 14 and the second rotating shaft 15 respectively, and a chain 32 between the two driving sprockets 30, 31 and maintain a synchronous rotation of the first rotating shaft 14 and the second rotating shaft 15.

When a rider steps on the left and right pedals 18 pivotally coupled to the first and second cranks 16, 17 by both legs, the first and second cranks 16, 17 use the first and second rotating shafts 14, 15 as rotation points to loop the pedals 18 along an elliptical track, and the driving sprockets 30, 31 installed on first and second rotating shafts 14, 15 will rotate accordingly, and the operation of the chain 32 can maintain a synchronous rotation anytime, such that the first and second cranks 16, 17 installed at the first and second rotating shafts 14, 15 can be rotated synchronously, and the pedals 18 can be driven by the first and second cranks 16, 17 to loop synchronously. Naturally, a clash-free and smooth looping movement along the elliptical track can be achieved to provide a smooth, comfortable and safe operation of the bicycle.

In other words, the first and second rotating shafts 14, 15, the first and second cranks 16, 17, the two driving sprockets 30, 31 and the chain 32 are operated and rotated synchronously, so that the pedals 18 pivotally installed to the first and second cranks 16, 17 will cause the first and second cranks 16, 17 to rotate synchronously without any clash, regardless of the position where the stepping force is applied, and the pedals 18 can be looped along an elliptical track, and the smooth, comfortable and safe stepping operation can be achieved.

Figure 4:
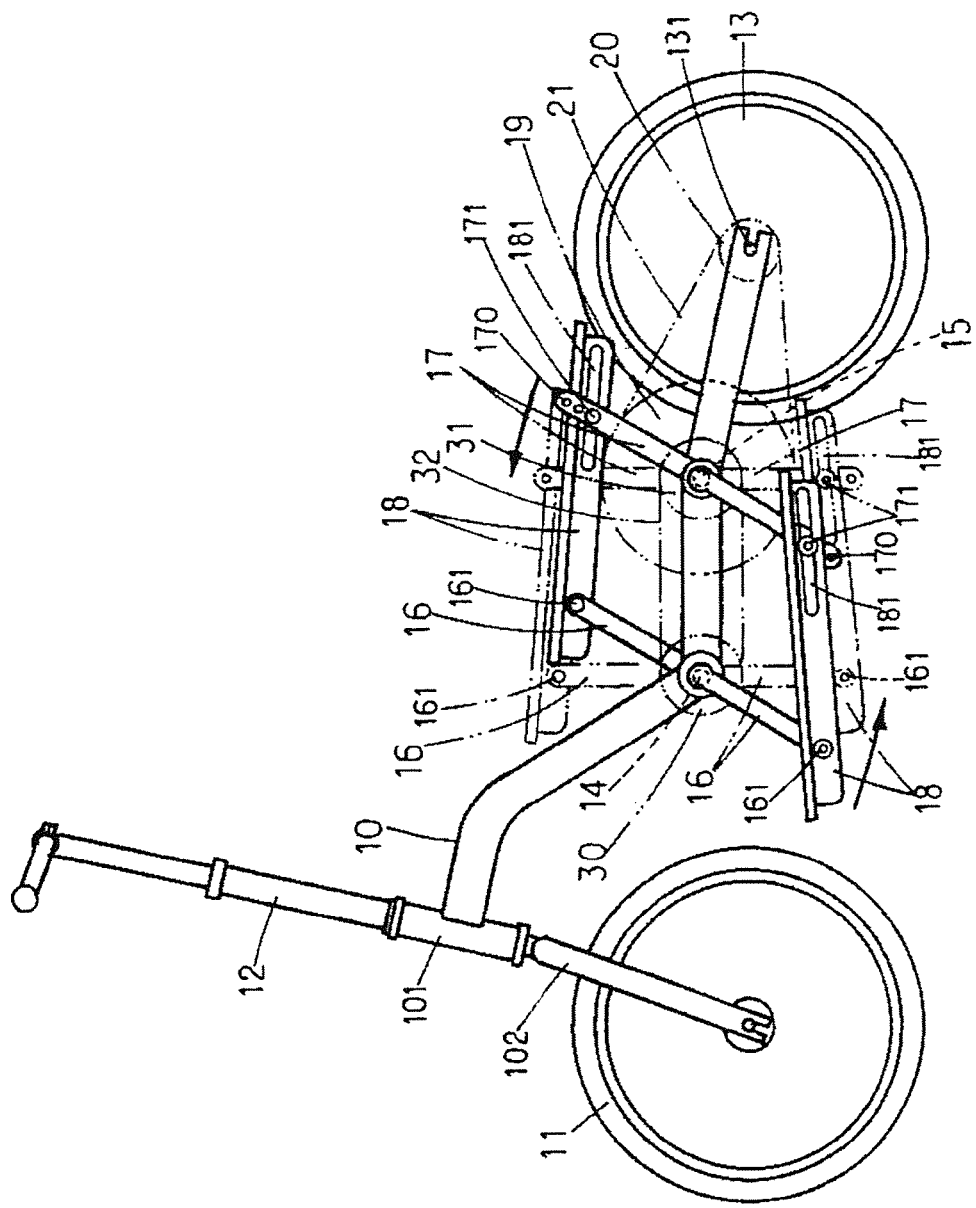
FIG. 4 is a schematic view of the second preferred embodiment of the present invention.
Figure 5:
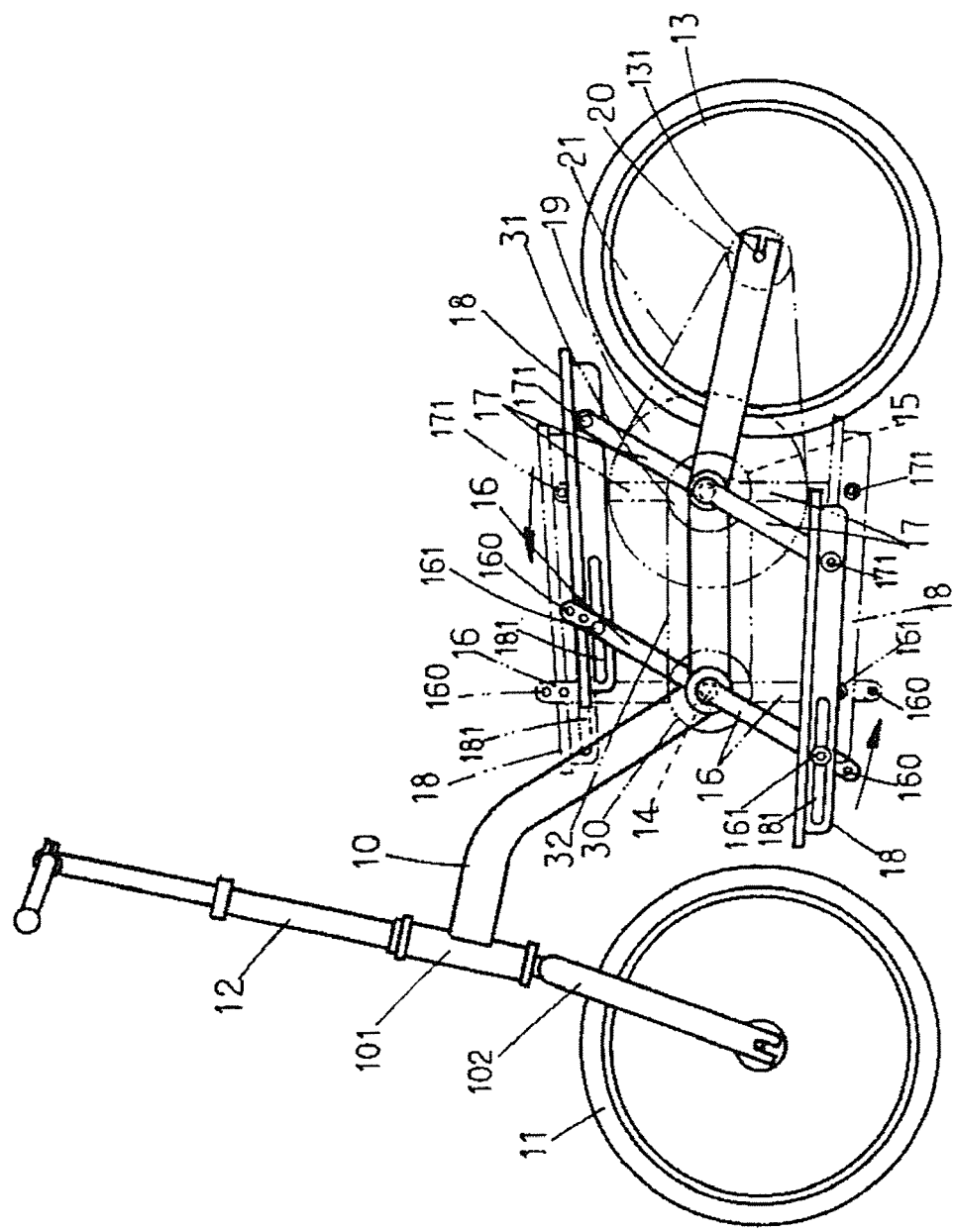
FIG. 5 is a schematic view of the third preferred embodiment of the present invention.
Figure 6:
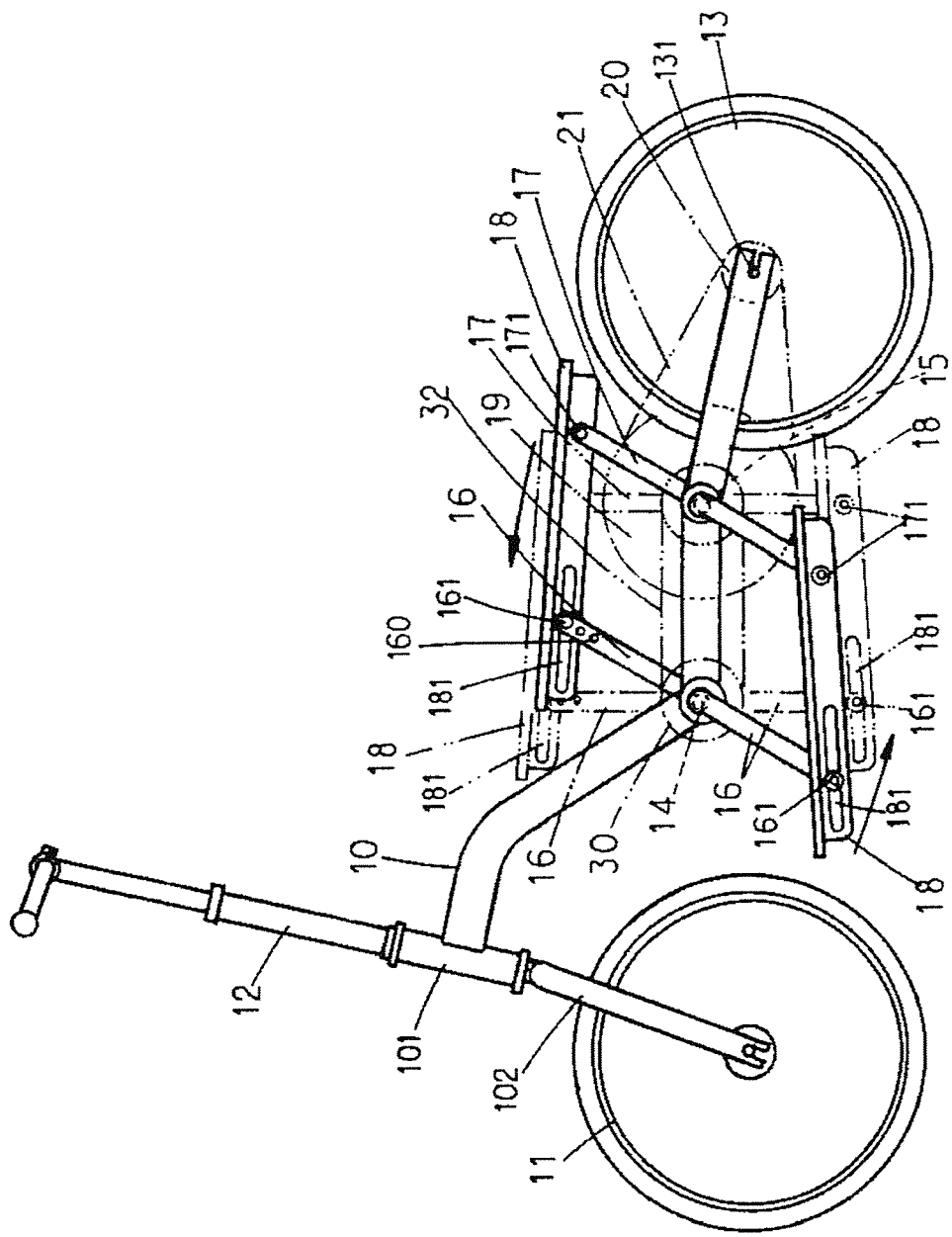
FIG. 6 is a schematic view of the fourth preferred embodiment of the present invention.

With reference to FIG. 4, a slide slot 181 is formed at an end of the pedal 18 for abutting and connecting the corresponding first crank 16 or second crank 17, and the corresponding first crank 16 or second crank 17 includes a plurality of positioning holes 160, 170 formed at different positions thereon for positioning the pivots 161, 171, and the pivot 161, 171 can be slidably installed in the slide slot 181. In FIGS. 2, 3, 5 and 6, when an end of the pedal 18 is pivotally coupled to the second crank 17 through the pivot 171, the pivot 161 of the first crank 16 can be pivotally coupled to the positioning hole 160 at a different position and slidably installed into the slide slot 181 of the pedal 18, and then the distance from the first rotating shaft 14 to the pedal 18 can be adjusted to a length equal or unequal to the distance from the second rotating shaft 15 to the pedal 18. Therefore, when a rider stands on the left and right pedals 18 and pedals the left and right pedals 18 by both legs, the left and right pedals 18 can be looped in an elliptical track in different configurations according to the distance from the first rotating shaft 14 to the pedal 18 to provide more variations, diversifications, and fun to the stepping and riding movements. In FIG. 4, after an end of the pedal 18 is pivotally installed to the first crank 16 through the pivot 161, the pivot 171 of the second crank 17 can be pivotally coupled to the positioning hole 170 at a different position and slidably installed into the slide slot 181 of the pedal 18, and the distance from the second rotating shaft 15 to the pedal 18 can be adjusted to a length equal or unequal to the distance from the first rotating shaft 14 to the pedal 18. Therefore, the rider can step on the left and right pedals 18 to loop the left and right pedals 18 alternately in a different elliptical track, so as to achieve the diversification, variation and fun of riding the bicycle.

With the transmission of the two driving sprockets 30, 31 and the chain 32, the first and second cranks 16, 17 can be rotated synchronously anytime, so that when the left and right pedals 18 are stepped alternately and looped along an elliptical track, the pivot 161, 171 situated in the slide slot 181 of the pedal 18 will slide along the slide slot 181 automatically without hindering the stepping movement of the pedals 18, such that a smooth, comfortable and safe pedaling operation of the pedals 18 can be achieved.

In summation, the present invention has the following advantages:

1. The device of the invention comes with a simple and economic structure and provides an easy and convenient operation.

2. The device of the invention provides a smooth, comfortable and safe pedaling operation of the standing type bicycle.

3. The device of the invention provides more variations, diversifications and fun to the pedaling operation of the standing type bicycle.

What is claimed is:

1. An improved pedal driving device of a standing type bicycle, comprising a frame, a front wheel, a control rod, a rear wheel, a first rotating shaft, a second rotating shaft, a first crank, a second crank, a pedal, a transmission sprocket and a chain, wherein the first rotating shaft and the second rotating shaft are pivotally installed to the frame and between the front and rear wheels; ends of the first and second cranks are disposed at both ends of the first and second rotating shafts respectively, and the other ends of the first and second cranks are respectively and pivotally coupled to both front and rear ends of the pedal, characterized in that a driving sprocket is installed separately at the first rotating shaft and the second rotating shaft, and a chain connected between the two driving sprockets maintains a synchronous rotation of the two driving sprockets.

2. The improved pedal driving device of a standing type bicycle as recited in claim 1, wherein an end of the pedal is pivotally coupled to the first or second crank by a pivot, and another end of the pedal has a slide slot formed thereon and provided for slidably installing the pivot of the second or first crank therein.

3. The improved pedal driving device of a standing type bicycle as recited in claim 2, wherein the first or second crank is corresponsive to the slide slot of the pedal and includes a plurality of positioning holes formed at different positions of the first or second crank for positioning the pivot.

* * * * *